United States Patent [19]

Johnson

[11] Patent Number: 4,680,859

[45] Date of Patent: Jul. 21, 1987

[54] THERMAL INK JET PRINT HEAD METHOD OF MANUFACTURE

[75] Inventor: Samuel A. Johnson, Eagle, Id.

[73] Assignee: Hewlett-Packard Company, Palo Alto, Calif.

[21] Appl. No.: 915,292

[22] Filed: Oct. 3, 1986

Related U.S. Application Data

[62] Division of Ser. No. 860,294, Dec. 6, 1985, abandoned.

[51] Int. Cl.[4] ........................ G01D 15/16; H05B 3/00; B05D 5/12; G03C 5/00

[52] U.S. Cl. .................................. 29/611; 29/157 C; 29/620; 29/621; 156/272.2; 156/273.9; 346/75; 346/140 R; 427/49; 427/58; 427/88; 427/402; 430/311

[58] Field of Search ............................ 346/75, 140 R; 29/157 C, 611, 620, 621; 156/272.2, 273.9; 427/49, 58, 88, 402; 430/311

[56] References Cited

U.S. PATENT DOCUMENTS

| | | | |
|---|---|---|---|
| 4,188,635 | 2/1980 | Giordano et al. | 346/75 |
| 4,437,103 | 3/1984 | Ikeda | 346/140 R |
| 4,558,333 | 12/1985 | Sugitani et al. | 346/140 R |

*Primary Examiner*—E. A. Goldberg
*Assistant Examiner*—Gerald E. Preston
*Attorney, Agent, or Firm*—William J. Bethurum

[57] ABSTRACT

In a thin film resistor substrate for a thermal ink jet printhead, there is provided an elongated ink feed slot for supplying ink to a plurality of heater resistors on the substrate. Ink flows from this slot vertically through the substrate and then laterally along predetermined ink flow paths in an orifice plate and barrier layer members to ink reservoirs above the heater resistors. In this manner ink flow pressure drops to all of the reservoirs are equal and thereby enhance ink pressure control for all of the reservoirs.

3 Claims, 4 Drawing Figures

THERMAL INK JET PRINT HEAD METHOD OF MANUFACTURE

CROSS REFERENCE TO RELATED APPLICATION

This application is a divisional of application Ser. No. 860,294, filed Dec. 6, 1985, now abandoned.

TECHNICAL FIELD

This invention relates generally to thermal ink jet printing and more particularly to a new and improved thermal ink jet printhead assembly.

BACKGROUND ART

Thermal ink jet printing has been described in many technical publications, and one such publication relevant to this invention is the *Hewlett Packard Journal*, Volume 36, Number 5, May 1985, incorporated herein by reference.

In the art of thermal ink jet printing, it is known to provide a plurality of electrically resistive elements on a common thin film substrate for the purpose of heating a corresponding plurality of adjacent ink reservoirs during the ink ejection and printing process. Using such an arrangement, the adjacent ink reservoirs are typically provided as cavities in a barrier layer above the substrate for properly concentrating thermal energy emanating from the resistive elements to predefined volumes of ink. Also, a plurality of ink ejection orifices are provided above these cavities and provide exit paths for ink during the printing process.

In constructing the above type of printhead assembly, one practice has been to drill vertical holes in a common substrate in order to provide ink flow paths from a common ink reservoir to the individual reservoir cavities within the barrier layer. However, the use of multiple holes (vertical cylindrical channels) in a single substrate possesses several disadvantages. One of these disadvantages is that the boring bit used for drilling holes in the substrate places a substantial pressure on the substrate material and thus can cause fracturing of this material. On the other hand, if laser drilling is utilized, the laser beam will leave channels with fratured side walls as a result of heating, and thus produce a weakened substrate structure.

The per se creation of mulitiple vertical channels in the silicon substrate weakens the printhead structure, and with some types of prior art printhead structures, these channels are used to provide ink flow to a plurality of resistive heater elements located at different distances from the channels. In such a structure, these varying ink-flow distances produce corresponding different pressure drops in the ink flow paths. That is, the pressure drop along a liquid ink flow path is proportional to the cube of the distance of the path. This fact has sometimes resulted in pressure drops over large ink flow distances sufficiently great as to prevent adequate vaporization during ink jet propulsion from the ink jet orifice.

Another disadvantages of using small diameter vertical channels to supply ink to the ink reservoirs is tha these channels simply do not have the capacity to adequately respond to certain ink volume demands at the required increasingly higher frequencies of operation.

A further disadvantage of using a plurality of ink flow channels in a common substrate is that they normally require a special routing of conductive leads on the substrate surface. In addition to the added costs associated with this special routing, this requirement also greatly reduces the achievable packing density because of the surface area required to accomodate such special routing schemes.

DISCLOSURE OF INVENTION

The general purpose of this invention is to provide a new and improved ink jet printhead assembly which eliminates the above problems associated with the use of drilled holes through a common printhead substrate member. In this new assembly, a single elongated slot is cut in the substrate and provides ink flow to a plurality of ink reservoirs associated with resistive heater elements formed above the top surface of the substrate. These heater elements are spaced around the periphery of the slot at predetermined distances therefrom. Conductive leads are provided on the substrate between each resistive heater element and external electrical connections, and a barrier layer and orifice plate member covers all of the resistive heater elements and defines a plurality of individual ink reservoirs respectively above each of the resistive heater elements.

The above described slotted geometry structure greatly increases the packing density of heater resistors on the common printhead substrate. This increase in packing density is partially a result of the fact that, in the prior art multiple hole printhead structures, the conductive traces to the individual resistor elements had to be routed around the holes, thus increasing the required substrate area. Thus, by using the elongated slot arrangement of this invention instead of vertical holes in the prior art structures, a packing density increases of 8:1 to 10:1 may be achieved.

After the orifice plate and associated barrier layer member are secured to the thin film substrate, the substrate is die bonded to a header manifold member. This manifold member has an elongated slot therein for passing ink from a well section of the header manifold and through the substrate slot to the individual reservoirs of the barrier layer and orifice plate member.

Accordingly, it is an object of the present invention to provide a new and improved thermal ink jet printhead assembly having an improved packing density for the heater resistors and their associated ink jet orifices and reservoirs.

Another object is to provide a new and improved manufacturing process for realizing this assembly using latest state-of-the-art semiconductor processing techniques.

A novel feature of this invention is the provision of improved control of ink flow pressures from a common ink supply source and through a single slot in a thin film resistor structure and then through a common ink flow path simultaneously to a plurality of ink reservoirs in the printhead assembly.

These and other objects and features of this invention will become more readily apparent from the following description of the accompanying drawing.

BEST MODE FOR CARRYING OUT THE INVENTION

Figure 1:
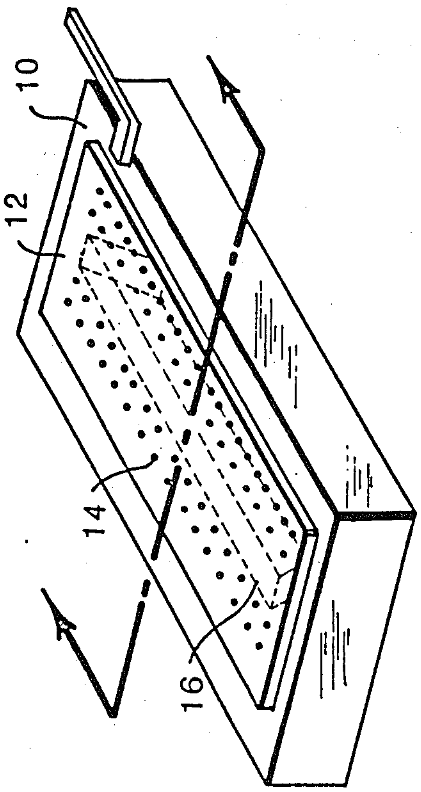
FIG. 1 is an isometric view of the slotted thin film resistor die (substrate) used in a preferred embodiment of the invention.

Referring now to FIG. 1, there is shown a thin film resistor substrate 10 for a thermal ink jet printer and including a metal orifice plate 12 thereon. The orifice plate 12 is typically constructed of nickel and includes a plurality of ink ejection openings or nozzles 14 spaced uniformly around the edges of an ink feed slot 16 indicated by the dotted lines in FIG. 1.

Figure 2:
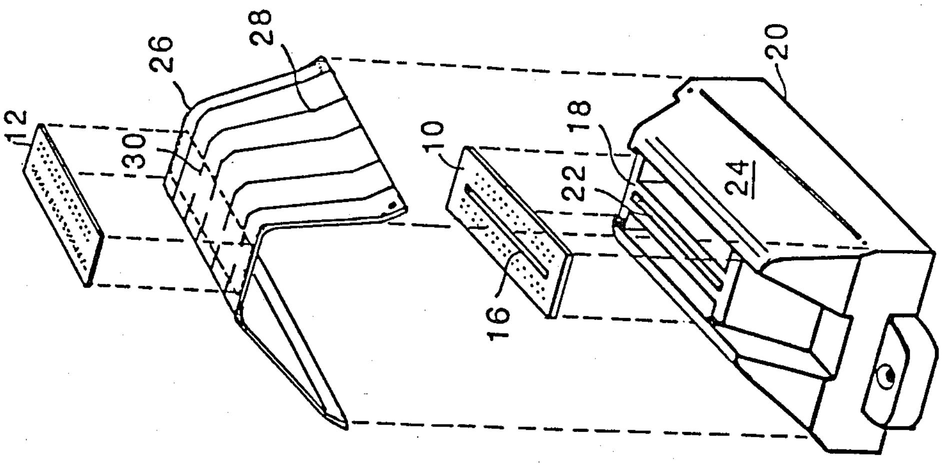
FIG. 2 is an exploded view showing the die placement, the external lead attachment, and the orifice plate attachment steps used in fabricating the complete thermal ink jet printhead assembly in a preferred embodiment of the invention.

Referring now FIG. 2, the thin film resistor substrate 10 will be mounted on the top, I-beam shaped surface 18 of a header manifold 20. The header manifold 20 will include an ink reservoir (not shown) within the confines thereof which communicates with an ink feed slot 22. The slot 22 is aligned with the ink feed slot 16 in the thin film resistor substrate 10. The header manifold 20 further includes contoured walls 24 which have been shaped to match corresponding contoured walls of an ink jet printer carriage assembly (not shown) for receiving the printhead structure of FIG. 2 when completely assembled.

When this printhead structure is completed and all the piece parts shown in FIG. 2 brought together, the thin film resistor substrate 10 is positioned directly on the upper surface 18 of the header 20, and a flexible, tape automated bond (TAB) circuit 26 is brought into electrical contact with conductive traces on the top surface of the thin film resistor substrate 10. A plurality of thin conductive leads 28 overlie the contoured side walls 24 of the heater 20, and the interior leads 30 of the tab bond flex circuit 26 are thermocompression bonded to conductive traces on the thin film resistor substrate 10 by a process disclosed and claimed in copending application Ser. No. 801,034 as now U.S. Pat. No. 4,635,073 of Gary E. Hanson and assigned to the present assignee. In addition, the orifice plate 12 will be brought into alignment with the thin film resistor substrate 10 by means of an orifice plate and barrier layer manufacturing process disclosed and claimed in copending application Ser. No. 801,169 of C. S. Chan et al., also assigned to the present assignee.

Figure 3A:
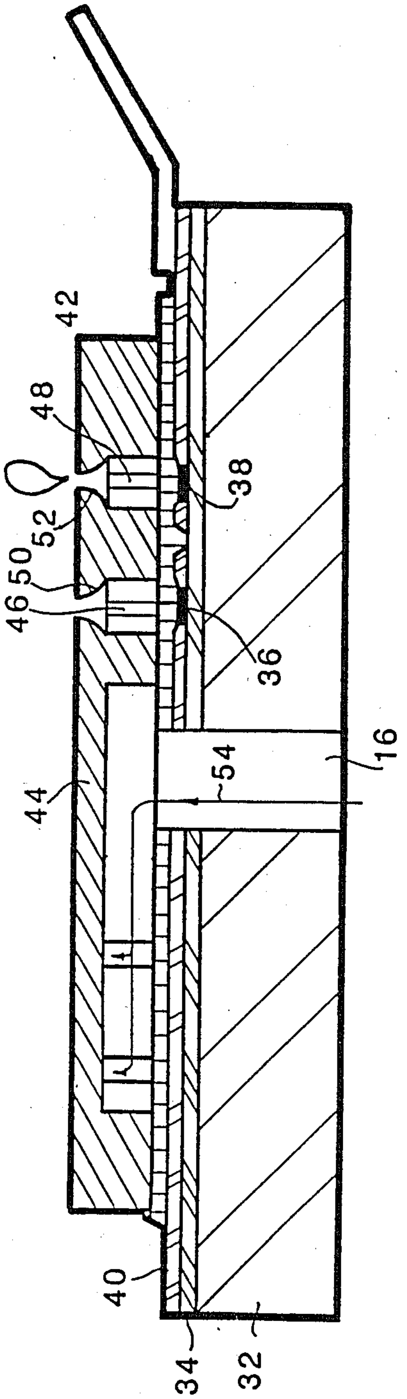
FIGS. 3A and 3B are fragmented and greatly enlarged plan and cross section views respectively, of the novel slot and lateral ink feed sections of the above printhead structure.
Figure 3B:
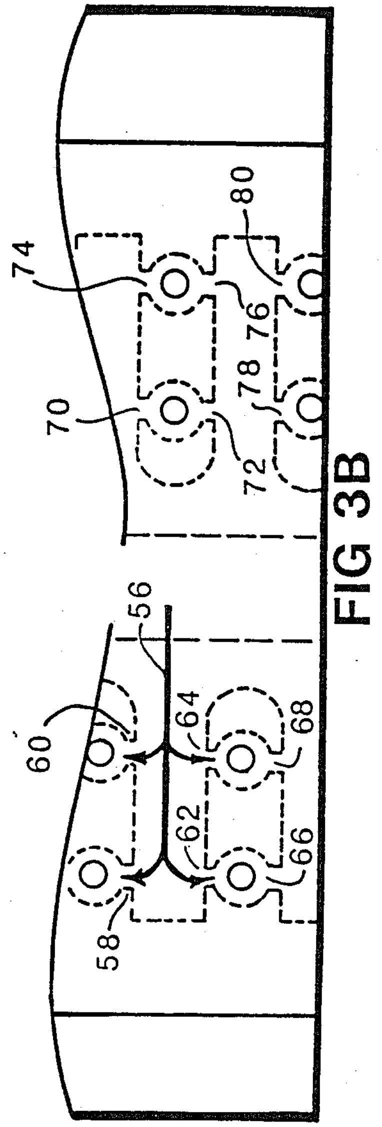

Referring now to FIGS. 3A and 3B, the thin film resistor substrate 10 will typically include a silicon substrate 32 upon which is deposited a thin layer 34 of silicon dioxide for passivating and insulating the surface of the silicon substrate 32. A plurality of heater resistors 36 and 38 are formed on the upper surface of the silicon dioxide layer 34 and will typically be either tantalum aluminum or tantalum pentoxide and fabricated using known photolithographic masking and etching techniques. Aluminum trace conductors 40 make electrical contact to the heater resistors 36 and 38 for providing electrical pulses thereto during an ink jet printing operation, and these conductors are formed from a layer of aluminum previously evaporated on the upper surface of the silicon layer 34 using conventional metal evaporation processes.

After the formation of the aluminum conductors 40 is completed, a surface barrier layer 42, typically of silicon carbide or silicon nitride, is deposited over the upper surfaces of the conductors 40 and the heater resistors 36 and 38 to protect these members form cavitation wear and the ink corrosion which would otherwise be caused by the highly corrosive ink located in the reservoirs directly above these heater resistors. The silicon carbide layer 42, as well as the previously identified $S_iO_2$ surface layer 34, resistors 36 and 38 and aluminum conductors 40 are all formed using semiconductor processes well known to those skilled in thermal ink jet and semiconductor processing arts and for that reason are not described in detail herein. However, for a further detailed discussion of such processes, reference may be made to the above *Hewlett Packard Journal,* Volume 36, Number 5, May 1985.

A nickel orifice plate 44 is positioned as shown on top of the silicon carbide layer 42 and includes ink reservoir areas 46 and 48 located directly above the heater resistors 36 and 38 for receiving ink therein by way of the horizontal slot 16. These ink reservoirs 46 and 48 extend vertically upward of the substrate 10 as shown and merge into the output ink ejection orifices defined by the convergent contoured walls 50 and 52. These contoured walls 50 and 52 have been designed to reduce cavitational wear and prevent "gulping" during an ink jet printing operation as described in more detail in the above identified copending Chan et al. application.

During an ink jet printing operation, ink will flow along the path indicated by the arrow 54 and laterally along the path 56 and into the ink flow ports 58, 60, 62, 64, 66 and 68 as identified on the left-hand portion of the structure of FIGS. 3A and 3B. Likewise, ink will enter the ink flow ports 70, 72, 74, 76, 78 and 80 on the right-hand portion of the structure of FIG. 3B. By flowing ink form a common ink reservoir into the plurality of flow ports identified above, the pressure drops in the ink from the ink feed slot 16 to the individual heater resistors, such as 36 and 38, will be equal and thus insure proper ink bubble evaporation and firing during an ink jet printing operation. The advantages of this feature of the invention in contrast to the prior art have been previously discussed above.

I claim:

1. A process for fabricating a thermal ink jet printhead assembly which includes the steps of:
   (a) providing a thin film resistor structure having a common ink feed opening therein and a plurality of resistive heater elements spaced around the periphery of said opening,
   (b) bonding a plurality of conductive leads into electrical contact with said resistive heater elements at the surface of said thin film resistor structure,
   (c) affixing an orifice plate to the surface of said thin film resistor structure, and
   (d) bonding said thin film resistor structure to an insulating header having an ink feed opening therein of dimensions corresponding to the dimensions of said ink feed opening in said thin film resistor structure, whereby ink may be fed through both of said openings in said header and said thin film resistor structure, respectively and into reservoir cavities in said orifice plate, and ink in said reservoir cavities may be heated from energy from said resistive heater elements and caused to expand through openings in said orifice plate during and ink jet printing operation.

2. A process for maximizing packing density of resistor heater elements and associated ink jet orifices in thermal ink jet printheads which includes:

(a) providing a thin film resistor structure having an ink feed opening therein around which resistor heater elements are spaced at predetermined distances, (b) making electrical contacts to said resistor heater elements, (c) mounting an orifice plate member atop said thin film resistor structure for ejecting ink therefrom upon receiving thermal energy from said resistor heater elements, and (d) affixing said thin film resistor structure to an insulating header having a matching ink feed opening therein for providing ink to said ink feed opening in said thin film resistor structure.

3. The process defined in claim 2 which also includes extending said electrical contacts along surfaces of said insulating heater, whereby the packing density of said contacts is also maximized.

* * * * *